(12) United States Patent
Fink et al.

(10) Patent No.: US 12,159,173 B2
(45) Date of Patent: *Dec. 3, 2024

(54) METHODS AND SYSTEMS FOR MULTIPLE ACCESS TO A SINGLE HARDWARE DATA STREAM

(71) Applicant: West Texas Technology Partners, LLC, Washington, DC (US)

(72) Inventors: Ryan Fink, Vancouver, WA (US); Ryan Phelps, Portland, OR (US); Gary Peck, Portland, OR (US); Bryan Ransil, San Francisco, CA (US)

(73) Assignee: West Texas Technology Partners, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,701

(22) Filed: Aug. 4, 2023

(65) Prior Publication Data

US 2024/0211326 A1    Jun. 27, 2024

Related U.S. Application Data

(63) Continuation of application No. 17/498,291, filed on Oct. 11, 2021, now Pat. No. 11,720,423, which is a (Continued)

(51) Int. Cl.
*G06F 3/00* (2006.01)
*G06F 9/54* (2006.01)
(Continued)

(52) U.S. Cl.
CPC .............. *G06F 9/545* (2013.01); *G06F 9/541* (2013.01); *G06F 9/4411* (2013.01); *G06F 9/44505* (2013.01); *G06F 9/544* (2013.01)

(58) Field of Classification Search
CPC ........................................................ G06F 9/54
See application file for complete search history.

(56) References Cited

U.S. PATENT DOCUMENTS 6,411,302 B1 *  6/2002  Chiraz ................... G09G 5/024
                                                   345/545
6,677,979 B1    1/2004  Westfield
(Continued)

OTHER PUBLICATIONS

Fabien Coelho, API Compilation for Image Hardware Accelerators. (Year: 2013).*
(Continued)

*Primary Examiner* — Lechi Truong
(74) *Attorney, Agent, or Firm* — Cadwalader, Wickersham & Taft LLP

(57) ABSTRACT

Methods for providing simultaneous access to a hardware data stream to multiple applications are disclosed. The first application to access a hardware device is responsible for providing and publishing an application programming interface (API) that provides access to the hardware device's data stream, which other applications can then call to gain access to the data stream. In some examples, the first application may be a server process or daemon dedicated to managing the hardware device data stream and publishing the API. In some further examples, the first application may instead may carry out user functionality unrelated to managing the hardware device.

15 Claims, 5 Drawing Sheets

Related U.S. Application Data continuation of application No. 16/393,436, filed on Apr. 24, 2019, now Pat. No. 11,157,335, which is a continuation of application No. 14/789,797, filed on Jul. 1, 2015, now Pat. No. 10,318,361.

(60) Provisional application No. 62/020,321, filed on Jul. 2, 2014.

(51) Int. Cl.
*G06F 9/4401* (2018.01)
*G06F 9/445* (2018.01)

(56) References Cited

U.S. PATENT DOCUMENTS

| | | | |
|---|---|---|---|
| 6,728,221 B1 | 4/2004 | Shaffer | |
| 6,738,822 B2 | 5/2004 | Fukasawa | |
| 7,631,119 B2 | 12/2009 | Moore | |
| 7,663,661 B2 | 2/2010 | Vallone | |
| 8,296,442 B2 * | 10/2012 | Keller | H04L 65/612 715/755 |
| 8,351,509 B1 | 1/2013 | Hurd | |
| 8,681,203 B1 | 3/2014 | Yin | |
| 9,069,952 B1 | 6/2015 | Paczowski | |
| 9,277,049 B1 * | 3/2016 | Danis | H04M 3/54 |
| 9,801,550 B2 * | 10/2017 | Ferrantelli | A61B 5/0077 |
| 9,817,539 B1 | 11/2017 | Jiang | |
| 10,313,737 B2 * | 6/2019 | Levy | H04N 21/6125 |
| 2002/0067412 A1 | 6/2002 | Kawai | |
| 2005/0078195 A1 | 4/2005 | Vanwagner | |
| 2005/0198302 A1 | 9/2005 | Ewanchuk | |
| 2006/0161960 A1 | 7/2006 | Benoit | |
| 2009/0154474 A1 | 6/2009 | Arima | |
| 2010/0039962 A1 | 2/2010 | Varesio | |
| 2010/0077441 A1 | 3/2010 | Thomas | |
| 2011/0010770 A1 | 1/2011 | Smith | |
| 2011/0055765 A1 * | 3/2011 | Neubrand | H04N 1/32122 713/400 |
| 2011/0242317 A1 | 10/2011 | Wengrovitz | |
| 2011/0249073 A1 * | 10/2011 | Cranfill | H04M 1/72469 348/14.02 |
| 2011/0289506 A1 | 11/2011 | Trivi | |
| 2012/0206566 A1 | 8/2012 | Fedoseyeva | |
| 2013/0151649 A1 | 6/2013 | Luna | |
| 2013/0335443 A1 * | 12/2013 | Harper | G09G 5/363 345/629 |
| 2013/0339583 A1 | 12/2013 | Shin | |
| 2014/0029916 A1 | 1/2014 | Dhawan | |
| 2014/0104440 A1 * | 4/2014 | Sampathkumaran | G06V 40/172 348/207.1 |
| 2014/0297799 A1 * | 10/2014 | Gordon | H04N 21/2402 709/217 |
| 2018/0205870 A1 | 7/2018 | Ikeda | |
| 2019/0090025 A1 * | 3/2019 | Chesson | H04N 21/466 |
| 2023/0153446 A1 * | 5/2023 | England | G06F 21/604 726/27 |
| 2023/0214819 A1 * | 7/2023 | Tham | G06Q 20/3674 705/64 |
| 2023/0401274 A1 * | 12/2023 | Denninghoff | G06Q 30/0251 |

OTHER PUBLICATIONS

Gábor Szárnyas, IncQuery-D: A Distributed Incremental Model Query Framework in the Cloud. (Year: 2010).*

Abelardo Lopez-Lagunas, Compiler Manipulation of Stream Descriptors for Data Access Optimization. (Year: 2006).

Adam O'Donovan, Real Time Capture of Audio Images and Their Use With Video. (Year: 2007).

Andrew D. Ferguson, Participatory Networking: an API for Application Control of SDNs. (Year: 2013).

Jun Kato, DejaVu: Integrated Support for Developing Interactive Camera-Based Programs. (Year: 2012).

Thomas Gloe, Unexpected Artefacts in PRNU-Based Camera Identification: a 'Dresden Image Database' Case-Study. (Year: 2012).

* cited by examiner

METHODS AND SYSTEMS FOR MULTIPLE ACCESS TO A SINGLE HARDWARE DATA STREAM

CROSS-REFERENCE TO RELATED APPLICATIONS

This application is a continuation of U.S. patent application Ser. No. 17/498,291, filed Oct. 11, 2021, now U.S. Pat. No. 11,720,423, which is a continuation of U.S. patent application Ser. No. 16/393,436 filed Apr. 24, 2019, now U.S. Pat. No. 11,157,335, which is a continuation of U.S. patent application Ser. No. 14/789,797, filed Jul. 1, 2015, now U.S. Pat. No. 10,318,361, which claims a benefit of U.S. Provisional Application No. 62/020,321, filed Jul. 2, 2014. All of these applications are hereby incorporated by reference in their entirety for all purposes.

BACKGROUND

The present disclosure relates generally to the management of data streams generated by computer hardware. In particular, methods and systems enabling the sharing of a single hardware data stream with multiple consuming applications are described.

Modern mobile devices are commonly equipped with hardware such as a camera that can be used by a variety of applications capable of being executed by the mobile device, so as to perform a variety of functions. For example, applications exist that can take pictures and video captured by the camera and manipulate them, edit them, insert them into other media, and/or upload them to online services for further distribution and usage. As the devices equipped with cameras and their associated applications grow in sophistication, the ways in which video streams can be utilized continues to broaden. The nascent field of wearable technology introduces the possibility for device control using gestures, detected by the built-in camera and processed by applications to accomplish a variety of tasks or commands previously clumsily accomplished using historically common means of input, such as a keyboard, pointing device, or voice control. The video feed from a wearable device, when coupled with a display positioned within the wearer's field of vision, also presents the opportunity for providing an augmented reality experience. Where the video stream coincides with the wearer's field of vision, an application can use image recognition techniques on the data stream to detect points of potential interest to the wearer, and provide notification of those points to the wearer by means of a display overlay.

Known implementations of managing data streams from hardware devices are not entirely satisfactory for the range of applications in which they are employed. For example, existing methods for managing the video stream from a camera require that an application be given exclusive control of the camera, effectively denying simultaneous access to the camera's data stream to any other applications that may need it. This is problematic when it is desirable for two applications that require the camera to be running simultaneously, such as in the foregoing example of one application that recognizes and acts upon user gestures made within the camera's field of view, and a second that interprets the camera stream and superimposes augmented reality cues on a transparent screen disposed within the user's field of view. Without simultaneous access to the camera data stream to both applications, it is impossible to present an augmented reality overlay while providing gesture recognition at the same time.

While this limitation could possibly be overcome using a single, monolithic application that provides both gesture recognition and the augmented reality overlay (as well as any other functionality that conceivably could be simultaneously desired), practical limits to the wearable device hardware platform must be recognized. A monolithic application typically imposes a greater memory footprint which, in the context of a wearable device or mobile platform that often has relatively limited working memory capacity when compared to a typical laptop or desktop computer, may result in fewer additional applications being able to run simultaneously. If separate processes for gesture recognition and augmented reality can be utilized, one or more of the applications can be unloaded when not needed (e.g. it may be desirable to have gesture recognition continuously active, but augmented reality overlays are only necessary at selected times), thereby saving working memory for other applications. Furthermore, a multiple process design is generally accepted as a more robust method of implementation as compared to a monolithic design, as a series of smaller modules are easier to debug, and any bugs that survive are isolated to a relatively limited functionality process that can be restarted.

Thus, there exists a need for methods of providing simultaneous access to a hardware data stream to multiple applications, improving upon and advancing the design of known hardware data stream access and sharing methods. Examples of new and useful methods for simultaneous hardware data stream access relevant to the needs existing in the field are discussed below.

SUMMARY

The present disclosure is directed to methods for providing simultaneous access to a hardware data stream to multiple applications. The first application to access a hardware device is responsible for providing and publishing an application programming interface (API) that provides access to the hardware device's data stream, which other applications can then call to gain access to the data stream. In some examples, the first application may be a server process or daemon, possibly included and launched as part of the operating system startup sequence, whose sole purpose is to manage the hardware device data stream and publish the API. In some further examples, the first application may not be a server or daemon, but instead may carry out user functionality unrelated to managing the hardware device, such as a user application.

DETAILED DESCRIPTION

The disclosed methods and systems for multiple access to a single hardware data stream will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein Many variations are contemplated for different applications and design considerations; however, for the sake of brevity, each and every contemplated variation is not individually described in the following detailed description.

Throughout the following detailed description, examples of various methods and systems for multiple access to a single hardware data stream are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
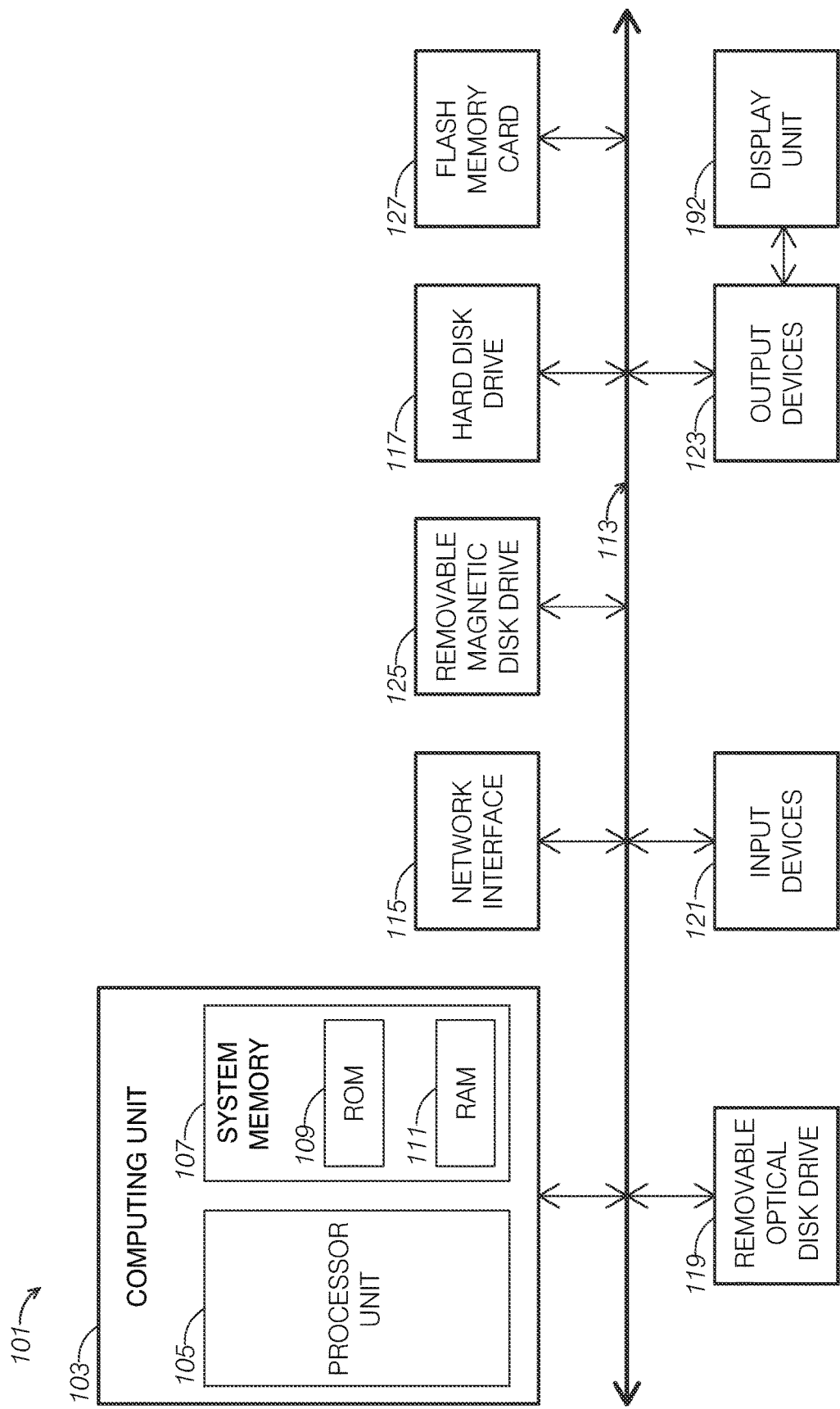
FIG. 1 shows a schematic view of an example of a programmable computing device.

Accordingly, FIG. 1 shows one illustrative example of a computer, computer 101, which can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, one or more motion sensors, a position sensor such as a GPS receiver, a camera or a microphone. Output devices 123 may include, for example, a monitor display, an integrated display, television, printer, stereo, or speakers.

Still further, computing unit 103 will be directly or indirectly connected to one or more network interfaces 115 for communicating with a network. This type of network interface 115 is also sometimes referred to as a network adapter or network interface card (NIC). Network interface 115 translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their maintained data may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according to the various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile and Windows 8), or Android operating systems.

Figure 2:
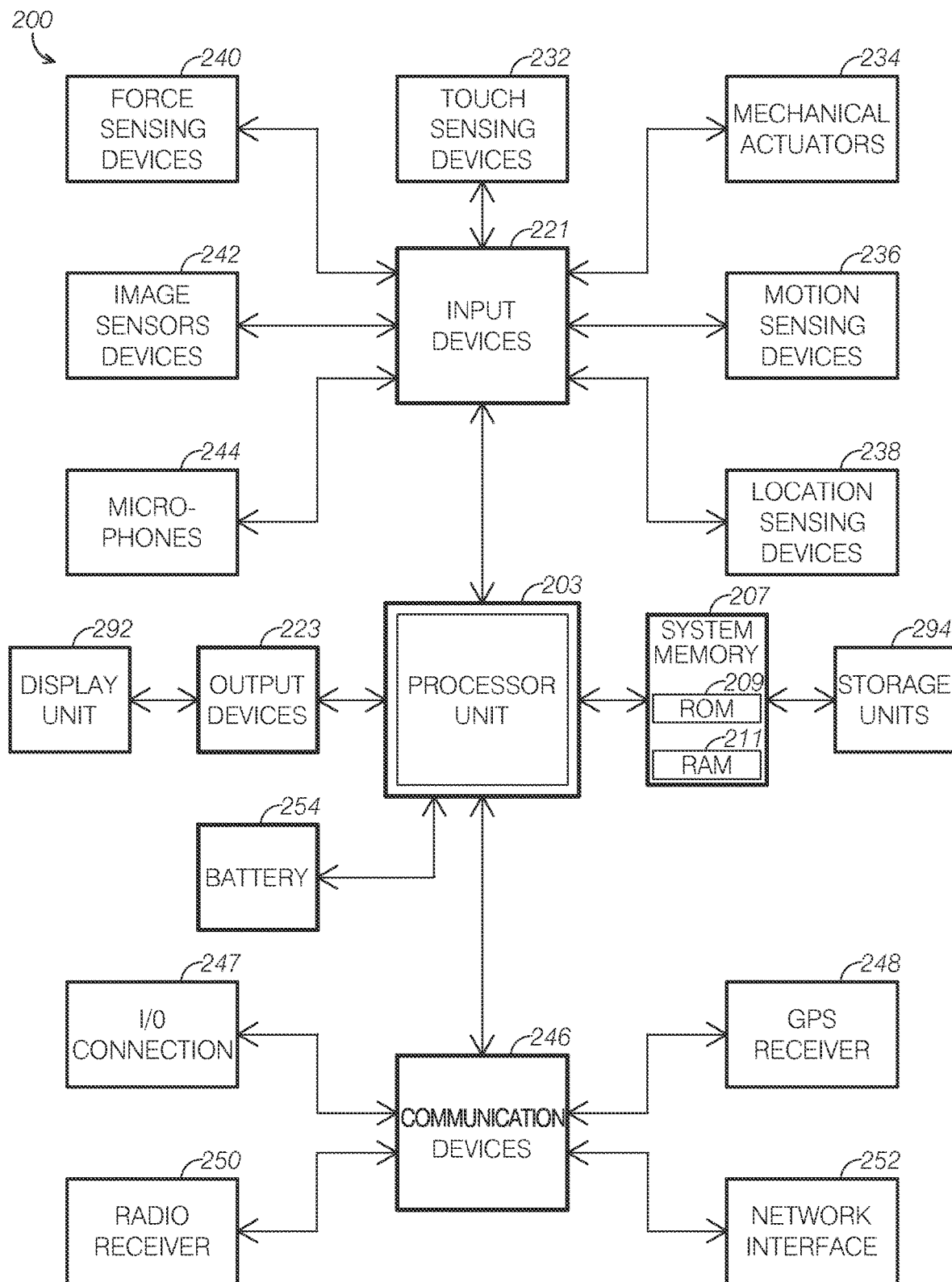
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well-known operating systems such as iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211, etc. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include the following: touch sensing devices 232 such as touch screens, touch pads and touch sensing surfaces; mechanical actuators 234 such as button or wheels or hold switches; motion sensing devices 236 such as accelerometers; location detecting devices 238 such as global positioning satellite receivers, WiFi based location detection functionality, or cellular radio based location detection functionality; force sensing devices such as force sensitive displays and housings, image sensors; cameras and microphones. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion. It will be understood in this disclosure by a person skilled in the relevant art that the terms "application" and "process" may be used interchangeably, as both terms refer to a single program as recognized by an operating system, which includes its own memory space, stack, etc., as appropriate to the system architecture. An application or process may have multiple threads of execution, and can communicate with other applications or processes via well-known interprocess communication techniques, such as calls, message buffers, files, sockets, or any other interprocess communication facility provided by an operating system that is now known or subsequently developed.

Figure 3A:
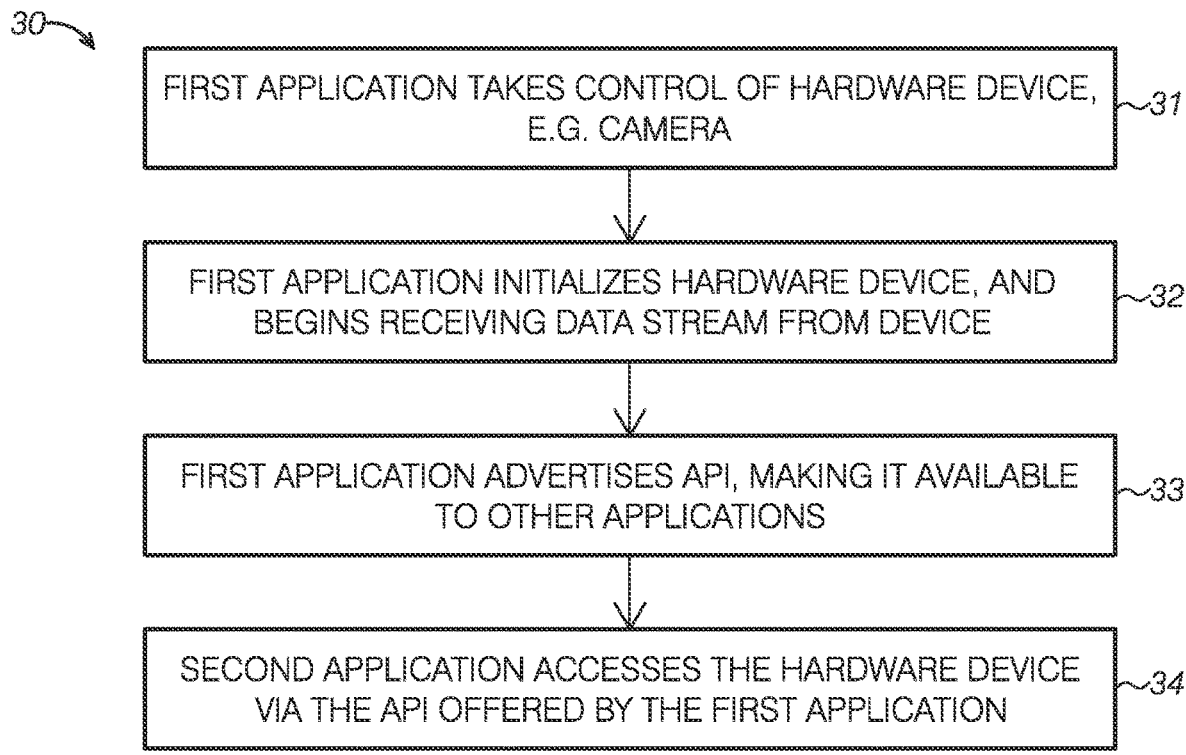
FIG. 3A is a flowchart of a first example of a method for multiple access to a single hardware data stream.
Figure 3B:
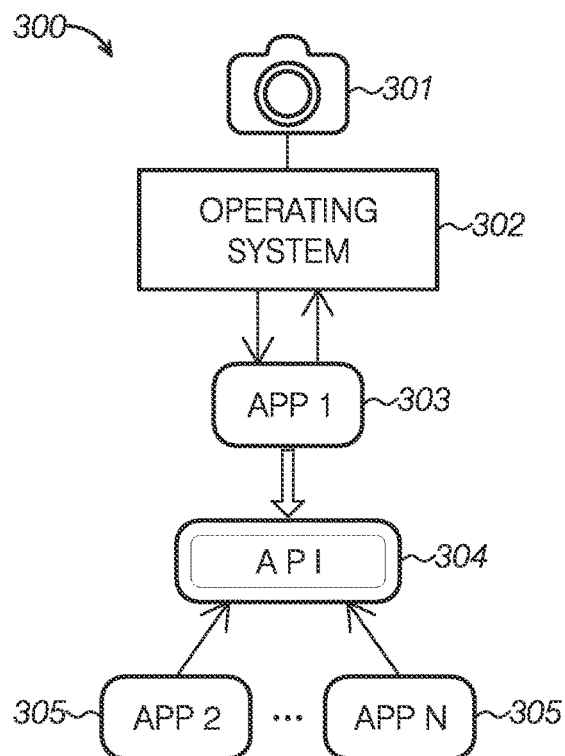
FIG. 3B is a block diagram of an example system implementing the method for multiple access to a single hardware data stream depicted in FIG. 3A.

With reference to FIGS. 3A-B, a first example of a method and implementing system for multiple access to a hardware data stream, method 30 for multiple access to a camera data stream will now be described. Method 30 functions to allow two or more applications to simultaneously access and utilize the data stream from a hardware device. In the example implementation described herein, such a data stream may come from a camera typical of those found on mobile devices such as mobile phones, tablets, and wearable computing devices like Google® Glass. Additionally or alternatively, method 30 can be used to provide simultaneous access to a data stream from any hardware device that otherwise would be exclusively available to only one application at a time. Other possible sources include audio reception devices such as microphone arrays, wireless receivers such as WiFi or Bluetooth receiver modules, motion sensors such as accelerometers, gyroscopes, magnetic compasses, and GPS receivers, or any other hardware device that can provide a continuous data stream that may be preferably subject to access by multiple applications. The reader is referred to the foregoing discussion of mobile device 200 and its associated peripherals for a more complete list.

Method 30 thus addresses many of the shortcomings existing with conventional methods of hardware data stream access. For example, by enabling simultaneous access to a camera, an application that processes the camera data stream to present an augmented reality overlay can analyze the camera feed and supply augmenting information while a second application that processes the data stream and performs gesture recognition is also enabled, and able to provide responses to user gestures and associated application control. The more robust software architecture of multiple independently-running processes can be readily implemented, with its associated advantages of easier debugging and crash isolation, as compared to a monolithic construction, with all possible functionality that may require use of the data stream included in a single process.

In FIG. 3A, method 30 includes step 31, where a first application takes control of a hardware device that outputs a data stream, e.g. a camera. In step 32, the first application initializes the hardware device, and begins receiving the device data stream. In step 33, the first application establishes and advertises an application programming interface (API), which is made available to other applications In step 34, a second application needing access to the same hardware device accesses the device by interfacing with the API presented by the first application.

As described in FIGS. 3A and 3B, step 31 is performed by a first application, shown as first application 303 in FIG. 3B In typical implementations, the system operating system arbitrates application access to hardware. The application thus receives control of the hardware device from the operating system, if available Known operating systems keep track of the application that currently has control of a hardware device, and if the device is currently in use, will notify a requesting application of the device unavailability In an implementation of the present invention, by providing and publishing a device access API, if the device is unavailable, the requesting application can learn the identity of the application presently in control of the requested hardware device from the operating system or other system reference list, and can then go to the controlling application and access the device through the published API, as in step 34 of method 30.

As will be discussed further below, the first application can be implemented as a server daemon that runs with enhanced system privileges, which establishes the device API and then sits idle and provides data stream access to any and all user level applications that require the data stream under control of the server daemon. The server daemon can optionally be implemented as part of an operating system installation package, and be run upon operating system startup and initialization. The server daemon can also be monitored by the operating system, and relaunched if a crash or error is detected to ensure relatively continuous and seamless access to the controlled hardware data stream. Such an implementation has the advantage of keeping the device continually initialized and ready to access, and also can provide enhanced system security and integrity by keeping the API and device data stream walled off to a known system-level service. Thus, user applications implemented by third parties are not required to implement the API, preventing the possibility of inconsistent API implementations, the possibility of the introduction of bugs depending on the application supplying the API, and/or inconsistent device and application behavior depending on the set of applications accessing the device and the order of application launch. However, such a method of implementation does potentially consume more system resources than having each individual application provide the API, as a server daemon will consume its own application resources and impose system overhead (albeit minimal) if kept in a waiting state Implementing the API at a user application level can potentially save system resources, which may be desirable in some mobile device implementations where system resources and processing power are limited, and acceptable system performance can only be achieved by keeping the running set of applications and services to a minimum. In such a case, the tradeoff between system stability and system performance may dictate user-level application implementation of the API For step 32, the application either requests that the operating system initialize the hardware device via a device driver or other service, or, depending on the implementing platform and hardware, the application may handle initialization directly. Initialization steps may include changing the device's power state (e.g. from sleep to wake), obtaining information about device capabilities, running any diagnostics and/or self-tests, allocating any supporting system resources, such as memory blocks, buffers, I/O ports, system interrupts, etc., and beginning to receive the device data stream. Actual initialization steps will depend upon the hardware device being utilized. In the example implementation where the hardware device is a camera, initialization steps may include receiving camera information such as camera resolution, pixel aspect ratio, frame rate, compression type (if compression is implemented in camera hardware), data rate, image format, and color space.

In step 33, the application publishes and advertises the API for the device, enabling access to the device to any other application by way of calls to the API. The API ideally makes available at least a minimal set of device features necessary for other applications to utilize basic device functionality. Such minimal sets may conform to accepted industry standards for particular types of devices, e.g. TWAIN for scanners, USB specifications for I/O and mass storage. For the example implementation using a camera, API capabilities may include the ability to tell a requesting application about camera information such as the pixel format, image size, and frame rate (if the data stream is a video format), the ability to notify the requesting application of changes to those parameters mid-stream, provisions for receiving the data stream from the camera consistent with the camera parameters specified by the API, and providing a time stamp of the image or video capture. The API can also optionally provide means to request changes to camera specifications if supported; for example, requesting a change in camera resolution or field of view.

Finally, in step 34 a second application uses this API to access the hardware and the associated data stream via the first application Provided it is supported by the API, this access may include requests for changes to the device state or controls. The first application responds to API calls and requests as appropriate. If the API supports controlling or changing the device state, the first application may need to arbitrate such requests depending on the first application's device data stream needs, and whether those needs conflict with any other requesting application needs. For example, with a camera device, if resolution or frame rate changes are supported and the first application controlling the camera requires a specific resolution and frame rate, it may be required to accommodate a different requested frame rate or resolution or notify the second requesting application of the unavailability of the requested frame rate or resolution.

Figure 4:
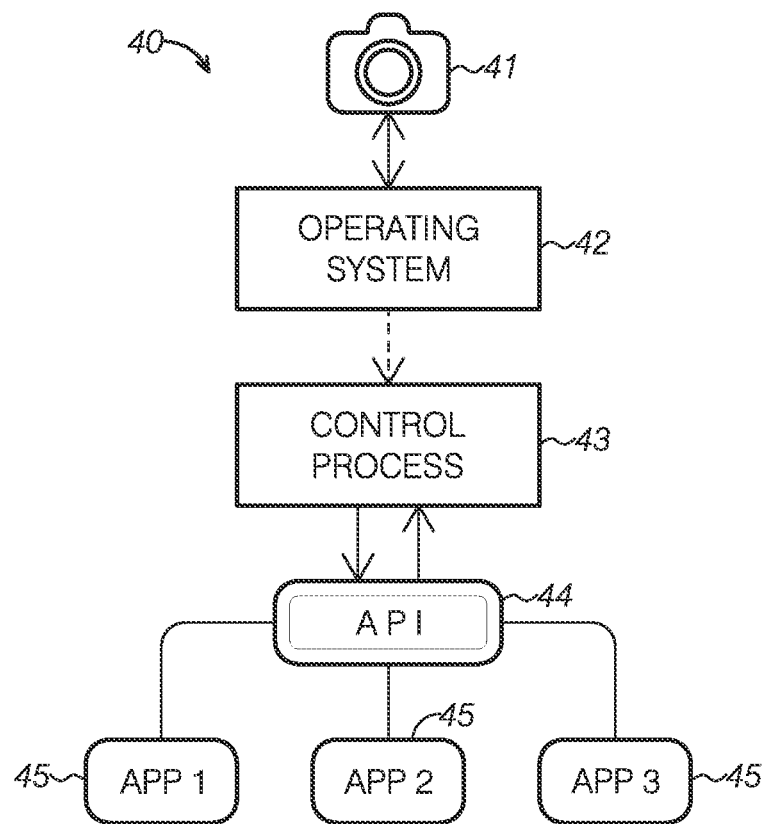
FIG. 4 is a block diagram of a second example system implementing the method for multiple access to a single hardware data stream depicted in FIG. 3A.

Considering FIG. 3B, an example system 300 that implements method 30 is depicted. System 300 is comprised of a camera 301 recognized and in communication with an operating system 302. First Application 303 performs the first application functions as detailed in the above description of method 30, including the provisioning of the API 304, which is then accessed by one or more second applications, depicted in FIG. 3B as apps 305, apps 2 through N. Turning attention to FIG. 4, a second example of a system 40 implementing a variant on method 30 above will now be described. System 40 includes many similar or identical features to a system implementing method 30. Thus, for the sake of brevity, each feature of system 40 will not be redundantly explained Rather, key distinctions between system 40 and method 30 will be described in detail and the reader should reference the discussion above for features substantially similar between the two implementing systems.

As can be seen in FIG. 4, system 40 includes a camera 41, which is recognized by an operating system 42. A control process 43 is in communication with camera 41 via operating system 42. Control process 43 provides an API 44, which in turn is accessed by one or more apps 45 that need access to the data stream of camera 41.

In the example system 40, control process 43 is an application that performs the steps that the first application described above in connection with method 30 performs, namely, obtaining control of the camera 41, performing initialization and data stream management, and API advertising and publishing, described above as steps 31-33. In this implementation, control process 43 is a server daemon as described above; control process 43's sole function is the control and management of the camera, and acting as the provider of the API 44 to apps that require access to the data stream of camera 41. In this sense, it differs from the first application 303 depicted in FIG. 3B insofar as control process 43 does not have any functionality unrelated to providing API 44, e.g. it does not act separately on the camera data stream to perform functions such as providing an augmented reality overlay or handling gesture recognition. It will be appreciated by a person having skill in the relevant art that the functionality of control process 43 may, in some implementations, be performed by operating system 42, which may obviate the need for control process 43 to be implemented as a separately running process.

Figure 5:
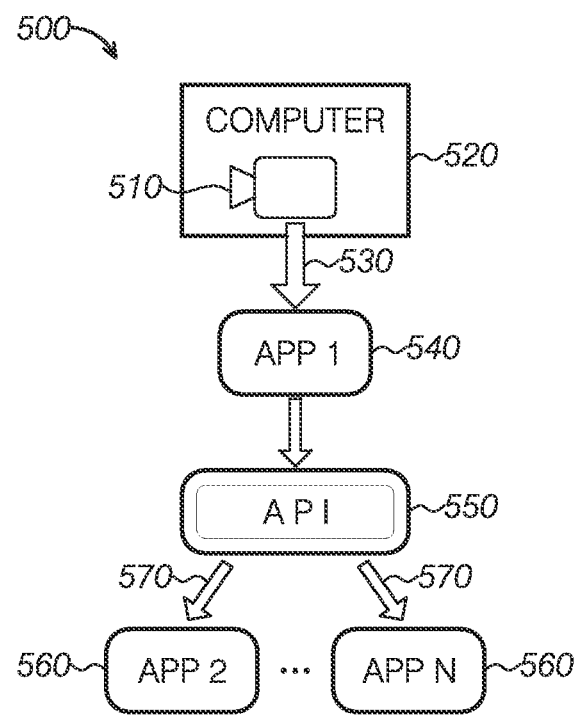
FIG. 5 is a block diagram of a third example system implementing the method for multiple access to a single hardware data stream depicted in FIG. 3A.

Considering FIG. 5, an example implementation of a system where the operating system either does not act as a hardware arbitrator (e.g. similar to implementations of MS-DOS, where applications could freely access hardware directly), the operating system acts as the first application to provide the API, or allows applications to directly talk to device drivers, is depicted. FIG. 5 also demonstrates the data flow from device to application once one of the disclosed methods has been initiated. System 500 is comprised of camera 510, which is optionally part of computer 520, as might be found in a mobile device 200. Data stream 530 is supplied to first application 540, which in turn provides data steam 530 via the API 550. Second and subsequent processes 560 can in turn access data stream or copies of data stream 570 via API 550.

Figure 6A:
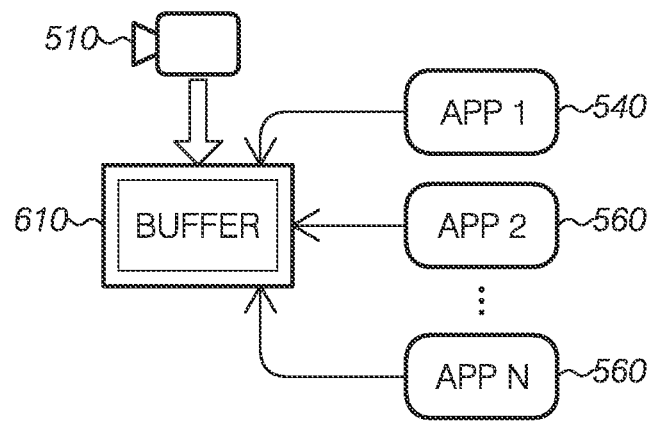
FIG. 6A is a block diagram of an example system implementing the method for multiple access to a single hardware data stream depicted in FIG. 3A, showing a first possible way in which data stream buffering may be handled.
Figure 6B:
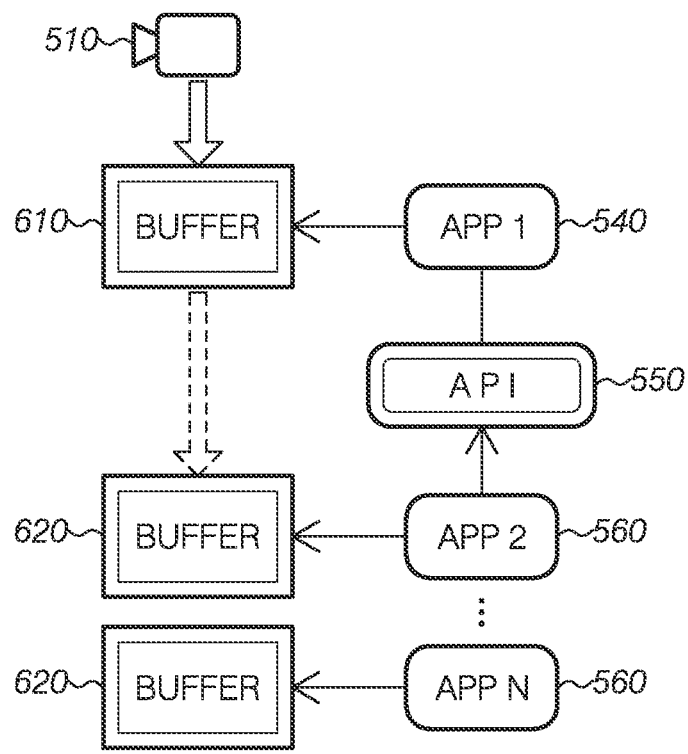
FIG. 6B is another block diagram of an example system implementing the method for multiple access to a single hardware data stream depicted in FIG. 3A, showing a second possible way in which data stream buffering may be handled.

FIGS. 6A and 6B depict methods by which first application 540 and API 550 can provide access to data stream 530 to multiple applications Due to the nature of multiprocessing systems, multiple applications may not be executing simultaneously, or may not be processing at the same speed. Accordingly, data stream access will not typically be synchronized between accessing applications, and each application will need sequential data stream access to ensure correct processing. In both figures, camera 510 writes its data stream into a primary buffer 610. FIG. 6A shows a possible implementation where first application 540 makes primary buffer 610 directly accessible via API 550 to all applications utilizing the data stream. First application 540 and subsequent processes 560 are all depicted accessing primary buffer 610. First application 540 and subsequent processes 560 may each be using a slightly different portion of the data stream provided in primary buffer 610. In this implementation, API 550 keeps track of the position in the data stream in primary buffer 610 for each respective accessing subsequent process 560, and returns data from primary buffer 610 appropriate to the current data stream location associated with each subsequent process 560. By using a single shared primary buffer 610, memory space is conserved. However, if integrity of the data stream is to be maintained, only camera 510 can be permitted to write to primary buffer 610; first application 540 and subsequent processes 560 may only read from primary buffer 610. Processing of the data stream that requires writing will necessitate that a copy of the processed data be made from primary buffer 610.

FIG. 6B shows an alternative variation for buffering the data stream between multiple applications. In FIG. 6B, each subsequent process 560 is accorded its own copy of primary buffer 620. Each time a new subsequent process 560 calls API 550 and requests access to camera 510, API 550 (and/or first application 540) creates a new copy of primary buffer 620, and directs camera 510 to write a copy of the data stream to each of primary buffer 610 and copy of primary buffer 620. As each of first application 540 and subsequent processes 560 looks to its own copy of the data stream, each of the primary buffer 610 and copy of primary buffer 620 can be read and written to by its associated process.

It will be appreciated by a person skilled in the relevant art that primary buffer 610 and each copy of primary buffer 620 can be filled either directly by camera 510, if the hardware and device drivers permit architecture such as Direct Memory Access, or by the operating system, or by first application 540 as part of implementing API 550. Each of primary buffer 610 and copy of primary buffer 620 can be implemented as a linear buffer that is sequentially filled by the data stream, or a circular buffer, where a fixed segment of memory is successively overwritten by the data stream as it repeatedly reaches the end of the fixed segment of memory, or any other method of hardware buffer implementation now known or later developed in the art. Each of these methods has its advantages and disadvantages: a linear buffer, while allowing access to a growing history of the data stream (useful for scrolling back through video or doing replays, or for performing change analysis of the current state of the data stream relative to its previous condition), is also potentially very memory intensive and, practically speaking, eventually reaches system capacity limits. A circular buffer, in contrast, is memory-efficient, but is limited in its ability to support analysis of the current data stream vis-a-vis historical data. Yet another implementation method may involve something of a hybrid; a flexibly sized buffer can be provided, where the start of the buffer is marked where the hardware is writing the data stream, and the end is where the accessing application is currently reading. As the accessing application reads the data stream, it is deleted, and the space freed up for the hardware to write incoming data. Such an implementation could run into capacity limitations if the reading application fails to keep up with the speed at which the hardware writes the data stream to the buffer.

It will also be appreciated that each application can, if necessary, copy data from primary buffer 610 or copy of primary buffer 620 to its own respective memory space to provide for historical data retention, especially where primary buffer 610 and copies of primary buffer 620 are implemented as circular buffers.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element. "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method comprising:
   initializing, by a first application, a camera that generates an image stream that includes a plurality of images;
   establishing, by the first application, exclusive control of the camera, wherein:
      the exclusive control of the camera comprises controlling settings of the camera; and
      a second application cannot control the settings of the camera;
   in response to receiving a request to access the image stream of the camera, initiating the first application;
   receiving, from the camera, the image stream at the first application;
   establishing, by the first application, an application programming interface (API);
   advertising, by the first application, the API;
   receiving, at the API, a request from the second application to access the image stream;
   sending, by the API, the image stream to the first application and the second application, wherein:
      the image stream is a single image stream received from the camera; and
      the image stream is the single image stream provided to both the first application and the second application at the same point in time;
   analyzing, by the first application, the image stream to determine gesture information from a user;
   analyzing, by the second application, the image stream to generate an augmented reality object to overlay onto the image stream;
   executing, by the first application, an instruction based on the gesture information;
   overlaying, by the second application, the augmented reality object onto the image stream; and
   in response to no further applications accessing the image stream, terminating the first application.

2. The method of claim 1, wherein the first application is a server daemon.

3. The method of claim 1, wherein the first application is a user application.

4. The method of claim 1, wherein initializing the camera further comprises:
   querying the camera to determine capabilities and characteristics of the camera; and
   initiating the image stream.

5. The method of claim 1, further comprising:
   receiving, at the first application, another request from the second application to change a first setting of the camera;
   determining, by the first application, whether the other request conflicts with a second setting required by the first application;
   in response to the other request not conflicting with the second setting required by the first application, changing the first setting of the camera as indicated in the other request; and
   in response to the other request conflicting with the second setting required by the first application, maintaining the second setting of the camera.

6. A system, comprising:
a data storage device to store instructions;
a processor coupled to the data storage device, the processor operable to execute the instructions; and
a camera coupled to the processor, the camera to generate an image stream, where in the processor is to:
establish a first application with exclusive control of the camera, wherein:
the exclusive control of the camera comprise controlling the settings of the camera; and
a second application cannot control the settings of the camera;
in response to receiving a request to access the image stream of the camera, initiate the first application;
receive, at the first application, the image stream from the camera;
establish, by the first application, an application programming interface (API);
advertise, by the first application, the API;
receive, at the API, a request from the second application to access the image stream;
send, by the API, the image stream to the first application and the second application, wherein:
the image stream is a single image stream received from the camera; and
the image stream is the single image stream provided to both the first application and the second application at the same point in time;
analyze, by the first application, the image stream to determine gesture information from a user;
analyze, by the second application, the image stream to generate an augmented reality object to overlay onto the image stream;
execute, by the first application, an instruction based on the gesture information;
overlay, by the second application, the augmented reality object onto the image stream; and
in response to no further applications accessing the image stream, terminate the first application.

7. The system of claim 6, wherein the processor is further to: initialize the camera in response to receiving the request from the first application access the camera.

8. The system of claim 6, wherein the processor is further to initialize the API in response to the initializing the camera, wherein the API is a server daemon.

9. The system of claim 6, wherein the processor is further to write the image stream into a buffer.

10. The system of claim 6, wherein the processor is further to write the image stream into a buffer, wherein the buffer is a circular buffer.

11. The system of claim 6, wherein the processor is to:
receive, at the first application, another request from the second application to change a first setting of the camera;
determine, by the first application, whether the other request conflicts with a second setting required by the first application;
in response to the other request not conflicting with the second setting required by the first application, change the first setting of the camera as indicated in the other request; and
in response to the other request conflicting with the second setting required by the first application, maintain the first setting of the camera.

12. A non-transitory computer-readable storage medium to store a set of instructions that when executed by a processor, cause the processor to:
initialize a hardware device;
receive a data stream from the hardware device;
establish a first application with exclusive control of the hardware device, wherein:
the exclusive control of the hardware device comprises controlling the settings of the hardware device; and
a second application cannot control the settings of the hardware device;
in response to receiving the request to access the image stream of the camera, initiating the first application;
receive the data stream at the first application;
establish an application programming interface (API);
advertise the API to the second application;
receive a request from the second application to access the data stream;
send the data stream to the second application, wherein:
the data stream is a single data stream received from the hardware device; and
the data stream is the single data stream provided to both the first application and the second application at the same point in time;
analyze, by the first application, the data stream to determine gesture information from a user;
analyze, by the second application, the data stream to generate an augmented reality object to integrate into the data stream;
execute, by the first application, an instruction of the set of instructions based on the gesture information;
integrate, by the second application, the augmented reality object into the data stream; and
in response to no further applications accessing the image stream, terminate the first application.

13. The non-transitory computer-readable storage medium of claim 12, wherein the processor is further to:
receive the data stream from the hardware device; and
store the data stream into a first buffer that is accessible by the first application and the second application.

14. The non-transitory computer-readable storage medium of claim 13, wherein the processor is further to copy the data stream from the first buffer to a second buffer, wherein the first buffer is accessible by the first application and the second buffer is accessible by the second application.

15. The non-transitory computer-readable storage medium of claim 12, wherein the processor is further to:
receive, at the first application, another request from the second application to change a first setting of the hardware device;
determine, by the first application, whether the other request conflicts with a second setting required by the first application;
in response to the other request not conflicting with the second setting required by the first application, change the setting of the hardware device as indicated in the other request; and
in response to the other request conflicting with the second setting required by the first application, maintain the first setting of the hardware device.

* * * * *